(12) United States Patent
Raghunandan (10) Patent No.: US 8,352,723 B2
(45) Date of Patent: Jan. 8, 2013

(54) AUTOMATIC MAINTENANCE OF A COMPUTING SYSTEM IN A STEADY STATE USING CORRELATION

(75) Inventor: Hulikunta Prahlada Raghunandan, Pune (IN)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 12/574,304

(22) Filed: Oct. 6, 2009

(65) Prior Publication Data

US 2011/0083008 A1    Apr. 7, 2011

(51) Int. Cl.
    *G06F 15/177* (2006.01)
(52) U.S. Cl. ............................ 713/100; 713/2
(58) Field of Classification Search .................. 713/1, 2, 713/100
    See application file for complete search history.

(56) References Cited

U.S. PATENT DOCUMENTS

| | | | |
|---|---|---|---|
| 4,755,925 A * | 7/1988 | Tsuchiya et al. ................ | 700/30 |
| 2003/0229471 A1 | 12/2003 | Guralnik et al. | |
| 2004/0210884 A1* | 10/2004 | Raghavachari et al. ...... | 717/158 |
| 2005/0134284 A1* | 6/2005 | Hoff et al. ..................... | 324/511 |

OTHER PUBLICATIONS

A.Y. Milanes et. al., "Design and Implementation of a global self-tuning architecture," Simposic Brasileiro de Bancos de Bados (USSB), Oct. 2005, MG, Brazil.
L. Stojanovic et. al., "The role of ontologies in autonomic computing systems," IBM Systems Journal, vol. 43, No. 3, 2004.

* cited by examiner

*Primary Examiner* — Paul Yanchus, III
(74) *Attorney, Agent, or Firm* — Jeff LaBaw (57) ABSTRACT

An autonomic computing system is automatically maintained in a steady state. The system has parameters, each of which has one or more threshold. The system may further have influencers, adjustment of which affects the parameters. A value of a first variable specifying how the parameters or influencers are changed once a decision has been made to change the parameters or influencers is received. A value of a second variable specifying how the system and the parameters are affected responsive to a change in the parameters is also received. Where influencers are present, a value of a third variable specifying whether the influencers are distinct or common is also received. One or more of the parameters or influencers are adjusted, based on the values of the first, second, and/or third variables, to return the parameters to more-normal (e.g., median) values.

19 Claims, 8 Drawing Sheets

FIG 1

AUTOMATIC MAINTENANCE OF A COMPUTING SYSTEM IN A STEADY STATE USING CORRELATION

RELATED APPLICATIONS

The present patent application is a related to previously filed and copending patent application entitled "automatic maintenance of a computing system in a steady state using correlation," filed on Dec. 3, 2007, and assigned Ser. No. 11/949,132, which is herein incorporated by reference.

FIELD OF THE INVENTION

The present invention relates generally to automatically maintaining an autonomic computing system in a steady state, and more particularly to automatic maintenance of such a system in a steady state by adjusting influencers and/or parameters based on correlation values that have been determined.

BACKGROUND OF THE INVENTION

An autonomic computing system is a computing system that includes a continuous control loop for monitoring activities that take place and for taking corrective actions as needed to adjust the system so that the system continues to perform its intended functionality and satisfy its intended objectives. Existing autonomic computing systems typically rely on a "bottom up" approach to implement this control loop. In particular, such an autonomic computing system typically includes one or more managed constituent elements that provide control loop functionality. Thus, to impart autonomicity within a computing system, the system has to be designed, developed, and implemented at an early stage to include such elements.

Such a "bottom up" approach to implementing a control loop within a computing system to provide the system with autonomicity can be disadvantageous. For instance, for existing computing systems that do not have autonomicity, adding one or more such elements can be difficult, if not impossible, to achieve without completely redesigning the systems at undue time and/or expense. Furthermore, constructing a computing system so that it is planned from the beginning to have autonomicity can itself even be laborious, especially where the system in question is or will be relatively large and/or complex. These and other shortcomings of the prior art are addressed by the present invention.

SUMMARY OF THE INVENTION

The present invention relates to automatically maintaining an autonomic computing system in a steady state. In one embodiment, the autonomic computing system includes a number of parameters, each of which has one or more thresholds. A method of this embodiment of the invention receives a value of a first variable and a value of a second variable. The first variable specifies how the parameters are changed in once a decision has been made to change the parameters, where the value of the first variable is real time or variable time. The second variable specifies how the system and the parameters are affected responsive to a change in the parameters, where the value of the second variable is also real time or variable time. The method adjusts one or more of the parameters that are each reaching one of the thresholds of the parameter, based on the values of the first variable and the second variable, so that these parameters return to more-normal (e.g., median) values.

In another embodiment, the autonomic computing system includes a number of parameters, each of which has one or more thresholds, and the system further includes a number of influencers, adjustment of which affects values of the parameters. A method of this embodiment of the invention receives values of a first variable, a second variable, and a third variable. The first variable species how the influencers are changed in once a decision has been made to change the influencers, where the value of the first variable is real time or variable time. The second variable specifies how the system and the parameters are affected responsive to a change in the parameters, where the value of the second variable is also real time or variable time. The third variable specifies whether the influencers each affect a distinct parameter or each affect more than one of the parameters in common. Thus, the value of the third variable is distinct or common. The method adjusts a given influencer to affect one or more of the parameters that are each reaching one of the thresholds of the parameter, based on the values of the first variable, the second variable, and the third variable, so that the these parameters return to more-normal (e.g., median) values.

It is noted that in the first embodiment described above, the parameters can be directly changed or modified. By comparison, in the second embodiment described above, the parameters may not be able to be directly changed or modified, but rather are affected (i.e., changed or modified) by changing or modifying influencers, which can cause resulting changes in the parameters. Furthermore, the methods of various embodiments of the invention may be implemented in one embodiment as one or more computer programs stored on a computer-readable medium. The computer-readable medium may be a tangible computer-readable medium, such as a recordable data storage medium or another type of tangible computer-readable medium.

Embodiments of the invention provide for advantages over the prior art. In contradistinction to the "bottom up" approach of implementing autonomicity within a computing system, embodiments of the invention effectively provide for a "top down" approach. That is, rather than concentrating on specific constituent elements of the system to implement autonomicity within the system, embodiments of the invention focus on the system as a whole—such as its influencers and parameters—to implement autonomicity. As a result, autonomicity is more easily added to existing computing systems that currently do not have autonomicity, and further may be added to even large and complex systems that may otherwise resist implementation of autonomicity therein.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Representative System

Figure 1:
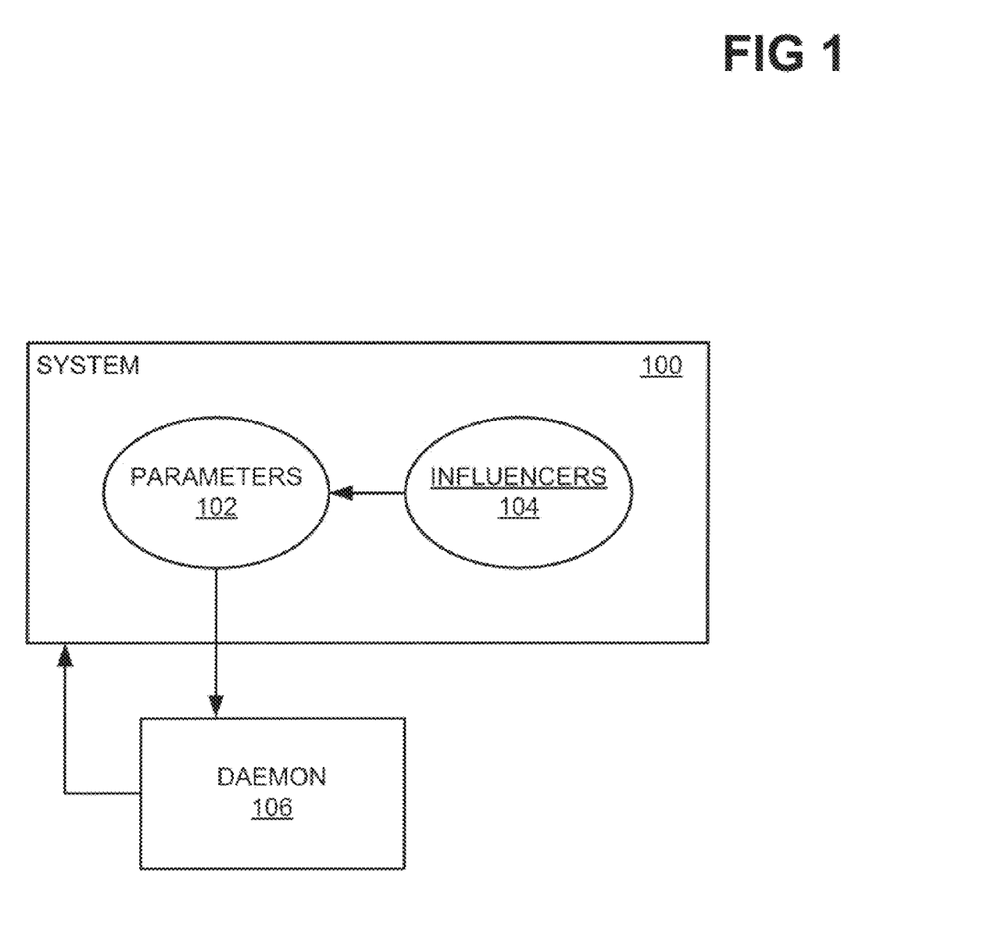
FIG. 1 is a diagram of a system, in relation to which embodiments of the invention can be implemented.

FIG. 1 shows a representative system 100, in relation to which embodiments of the invention described below can be implemented. The system 100 is a computing system. The system 100 includes a number of parameters 102 and a number of influencers 104. Those of ordinary skill within the art can appreciate that the system 100 typically will and does include other components, in addition to those depicted in FIG. 1, such as processors, memory, storage devices, and so on.

The parameters 102 of the system 100 are attributes or characteristics of the system 100 by which the current state of the system 100 can be determined. In particular, each of the parameters 102 may have one or more thresholds corresponding to when the system 100 is no longer in a desirable steady state. These thresholds of each parameter may include a minimum threshold, corresponding to a minimum value of the parameter in question, and/or a maximum threshold, corresponding to a maximum value of the parameter in question. It can be said that the system 100 is not at a desirable steady state when any of the parameters 102 have a value at its minimum or maximum threshold.

Examples of operating system-related parameters include the number of clients that can be operated by the operating system in question, such as the AIX operating system. Examples of DB2 database manager-related parameters include the amount of memory that is allocated from operating system memory. This amount of memory is adjusted based on fetching data from storage, writing back from to storage, transactions, sorting data for transactions, applications, as well as other requirements.

Examples of Java-related parameters, for the Java programming language, include the parameters known to those of ordinary skill within the art as the following:

Xgcthreads<n>, referring to the number of threads;
Xnoclassgc, referring to whether garbage collection is on or off;
Xnocompactgc, referring to whether compaction is turned on or off;
Xoss<size>, referring to the maximum Java-related stack size for a given thread;
Xss<size>, referring to the maximum native stack size for a given thread;
Xlp, referring to whether large page support is enabled;
Xdisableeplicitgc, referring to whether garbage collection is turned on or off;
Xifa:<on/off/force>, referring to whether Java code is able to be run on z/OS zAAP processors, as known within the art;
Xmaxe/Xmine, referring to the maximum and minimum expansion unit that is set during allocation;
Xms, referring to minimum heap size; and,
Xmx, referring to maximum heap size.

The influencers 104 of the system 100 influence the parameters 102 either directly or indirectly. Thus, perturbing or adjusting an influencer ultimately causes one or more of the parameters 102 to change value, either immediately or over time. The influencers 104 are therefore the mechanism by which the parameters 102 are modified so that the system 100 remains in a steady state, and so that the parameters 102 preferably do not reach any of their corresponding thresholds. For instance, examples of the influencers 104 include, in relation to the Java programming language, objection allocation rate, object mortality and load characteristics, and so on, in particular relation to the Xms and Xmx parameters.

A daemon 106 monitors the parameters 102 of the system 100 to determine if any of the parameters 102 have values that are tending towards thresholds, or if any of the parameters 102 have values that have reached thresholds. In response, the daemon 106 notifies the system 100. As such, the system 100 can appropriately perturb or adjust the influencers 104 so that these parameters 102 return to more-normal values and do not reach or no longer are at thresholds. The daemon 106 is a background process or service, which may run on the system 100 itself or on another system.

In this way, the computing system 100 is an autonomic computing system that is automatically maintained in a steady state. As the parameters 102 of the system 100 are tending towards thresholds, or have reached their thresholds, the influencers 104 are perturbed so that the parameters 102 return to more-normal values, such as median values between the maximum and minimum thresholds of the parameters 102. The daemon 106 assists the system 100 in this respect by communicating to the system 100 when one or more of the parameters 102 are varying from their more-normal values.

Parameters-Only Embodiments

In the first embodiment of the invention, the system 100 of FIG. 1 includes parameters 102 but no influencers 104. Thus, the system 100 is implemented using correlation between only the parameters 102 of the system 100. The parameters 102 can affect the entire system 100, but not any individual autonomic elements of the system. Statistical-based correlation techniques are employed to identify the relationships between the parameters 102 and the system 100, and also between the parameters 102 and the time it takes to affect the parameters 102 and the system 100.

In mathematical terms, the daemon 106 monitors the values of the parameters 102 in the system, where there are n parameters P: $P_1, P_2, \ldots, P_n$. Each parameter $P_x$ also has two thresholds. The first threshold is a minimum threshold $T_{xmin}$ corresponding to the minimum value of the parameter $P_x$, and the second threshold is a maximum threshold $T_{xmax}$ corresponding to the maximum value of the parameter $P_x$.

In this system 100, when a given parameter $P_1$ approaches $T_{p1min}$ or $T_{p1max}$, then the parameter $P_1$ is modified by the system 100 automatically by receiving a trigger from the daemon so that $P_1$ stays within its boundary values. The parameters are changed in real or variable time, depending on the dynamics of the system 100. The parameters are also changed when they stabilize to a particular value, again in real or variable time.

The correlation r between two variables x and y is given as:

$$r = \frac{n\sum xy - (\sum x)(\sum y)}{\sqrt{n(\sum x^2) - (\sum x)^2} \sqrt{n(\sum y^2) - (\sum y)^2}} \quad (1)$$

In Equation (1), n is the number of the pairs of data. The value of r lies between −1 and 1. If the value of r is positive, there is positive correlation, and if the value of r is negative then there is negative correlation. The closer the value of r is to 1, the higher the (positive) correlation.

In complex systems, where there are many parameters and many data points, a clear dependency among the parameters may not be apparent. As such, the correlation coefficient is an effective way of identifying dependencies. By changing one data point, the other data point can be influenced.

In a parameter-only model, four scenarios are considered. First, the parameters are changed in real time, and the system and the parameters are affected in real time. Second, the parameters are changed in real time, and the system and the parameters are affected in variable time. Third, the parameters are changed in variable time, and the system and the parameters are affected in real time. Fourth, the parameters are changed in variable time, and the system and the parameters are affected in variable time.

The terminology "real time" means that the change or affectation in question occurs immediately. For example, when it is decided that a parameter is to be changed, if the parameter can be changed in real time, then the parameter is changed immediately. Likewise, a first parameter that is affected in real time means that when a second parameter on which the first parameter is dependent is changed, the first parameter is immediately affected.

The terminology "variable time" means that the change or affectation in question does not occur immediately, but rather it takes a given amount of variable time before the effects of the change or affectation are actually evidenced or seen in the parameter. For example, when it is decided that a parameter is to be changed, if the parameter is changed in variable time, then the change in the parameter is seen after a length of variable time has elapsed. Likewise, a first parameter that is affected in variable time means that when a second parameter on which the first parameter is dependent is changed, the first parameter is affected after a length of variable time has elapsed. Thus, the response time in change or affectation can be variable (i.e., being a "variable" time), as opposed to being static.

In the four scenarios of these embodiments of the invention, the parameters $P_1, P_2, \ldots, P_n$ are the n parameters that control the steady state of the system in question. Thus, for instance, $P_1$ has a set of numerical values over different instances of time during steady state, denoted as $P_1 = \{P_{1v1}, P_{1v2}, \ldots, P_{1vm}\}$. There is further an interface that permits the values of the parameters to be changed. Furthermore, due to the dynamics of the system, the parameters are changed in time $P_{changed}$ and the parameters or the system is actually affected at time SP. It is assumed that historical values of P, $P_{changed}$, and SP are available to the system, or obtained over a period of steady state of the system.

Figure 2A:
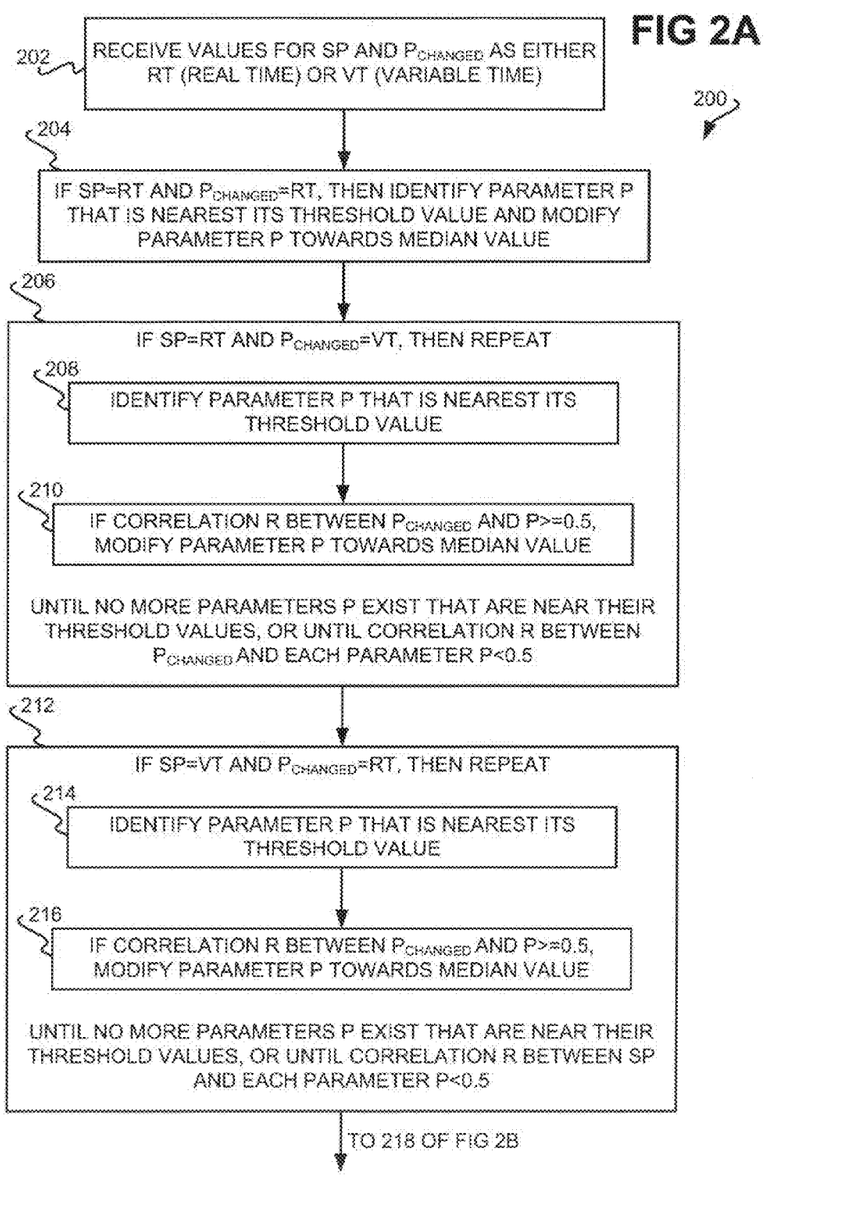
FIGS. 2A and 2B are flowcharts of a method, according to a parameters-only embodiment of the invention.
Figure 2B:
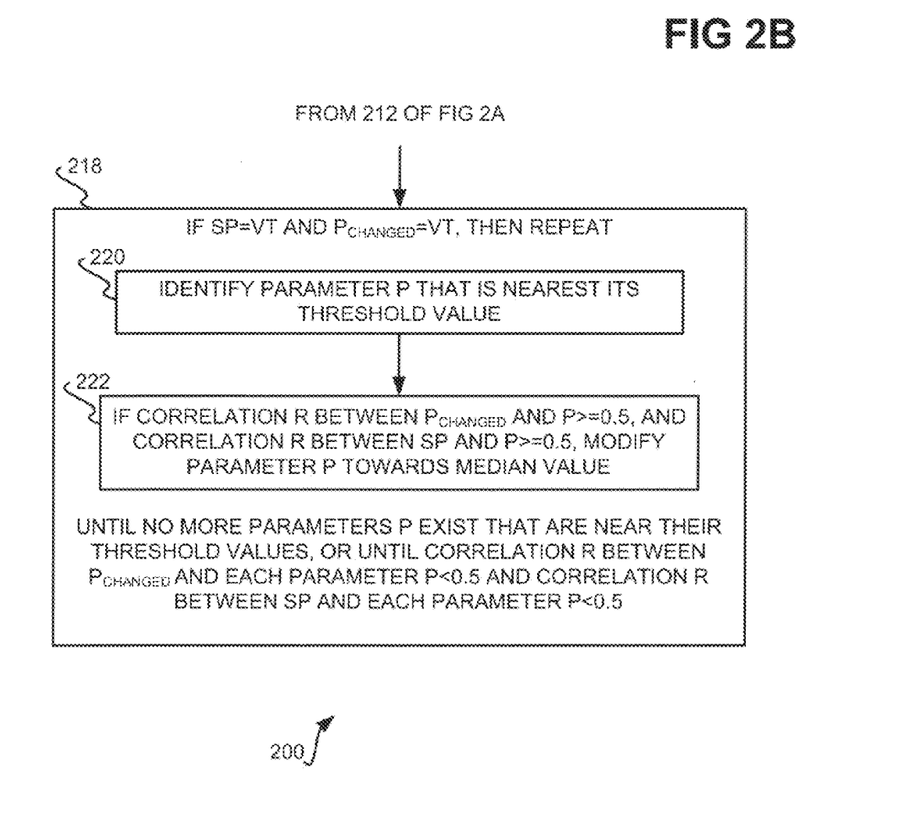
Figure 3A:
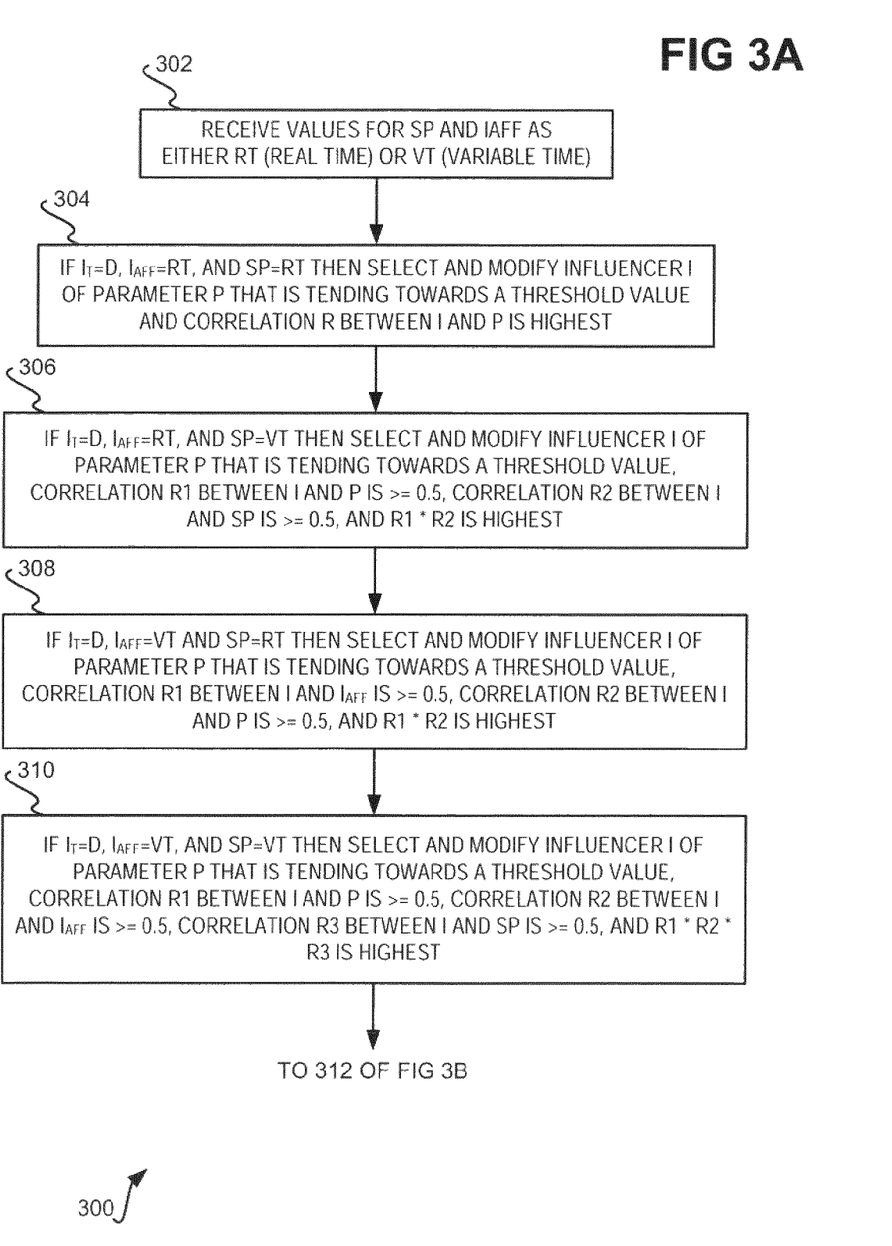
FIGS. 3A, 3B, 3C, 3D, and 3E are flowcharts of a method, according to a parameters-and-influencers embodiment of the invention.
Figure 3B:
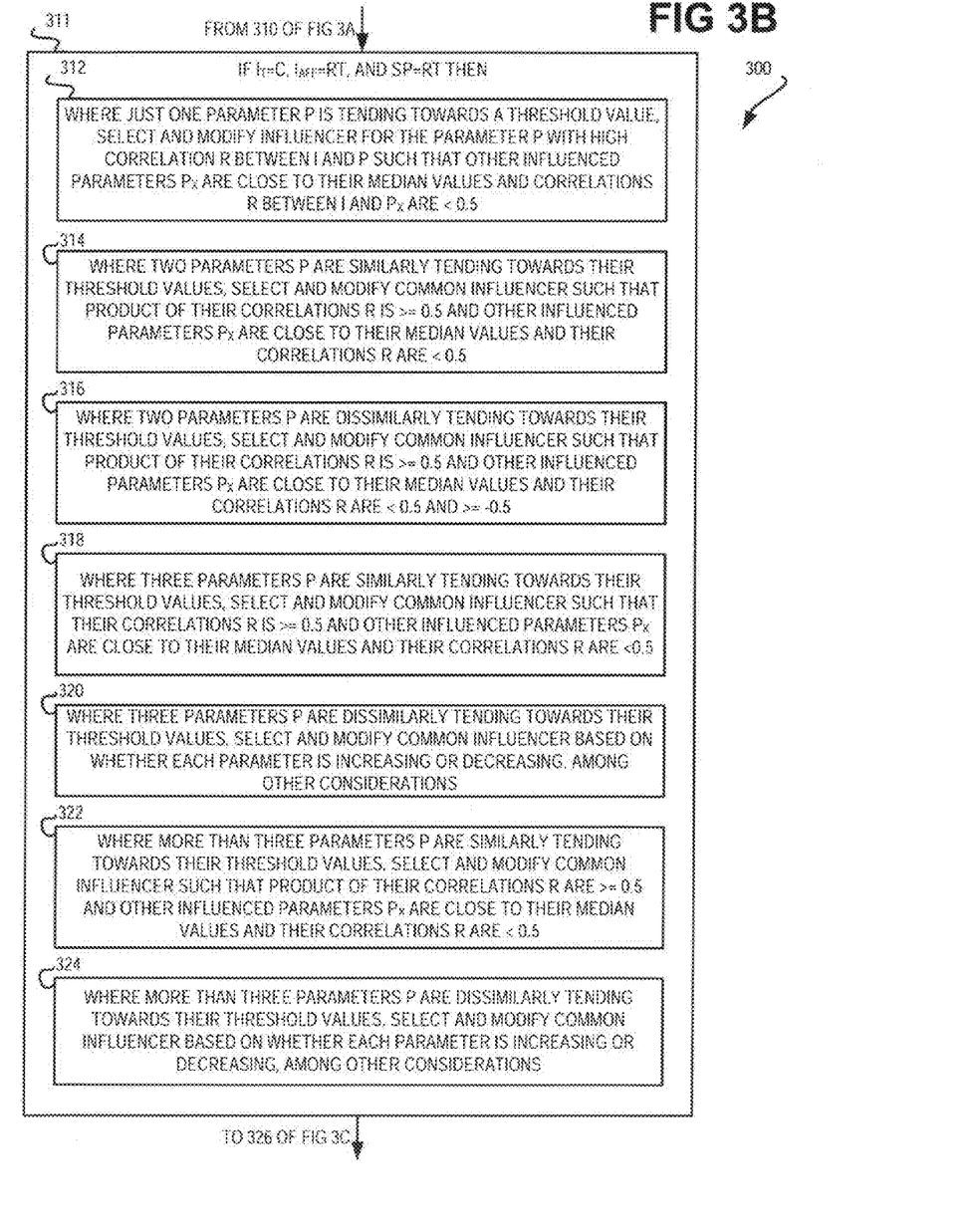
Figure 3C:
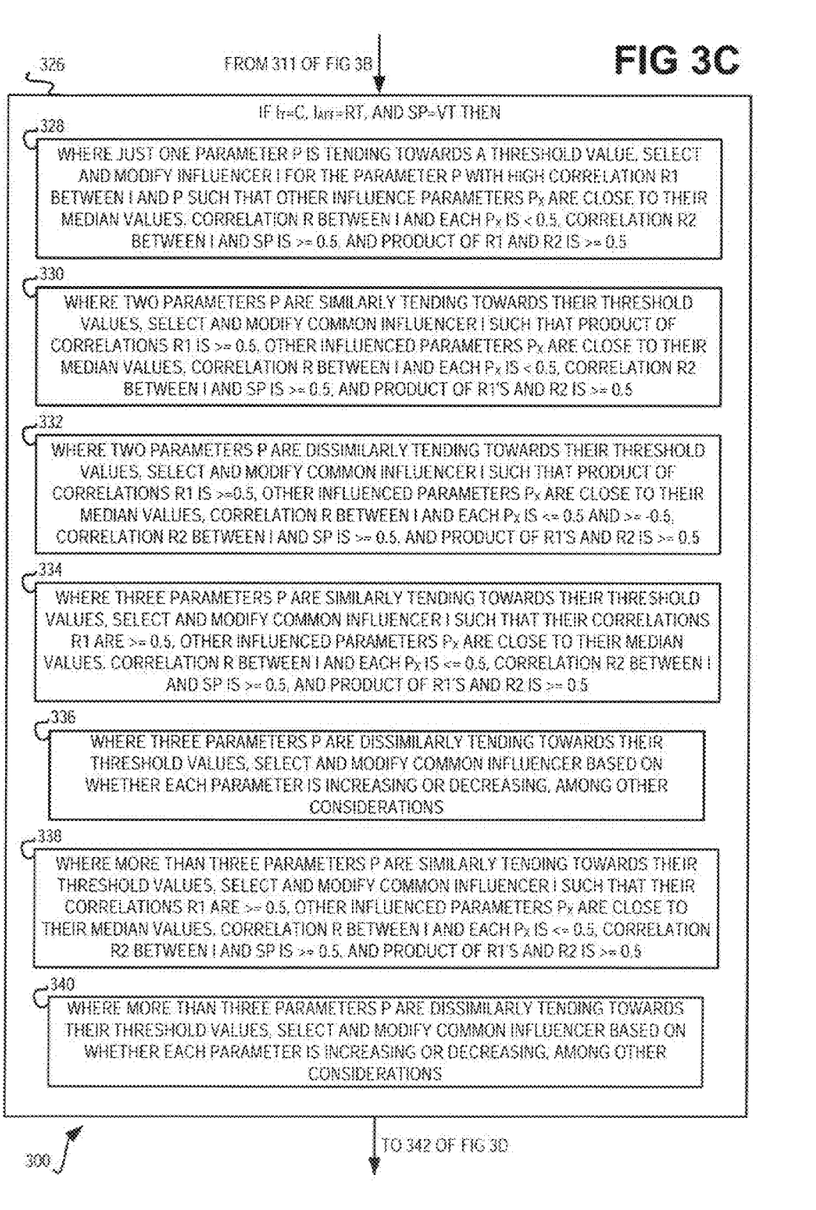
Figure 3D:
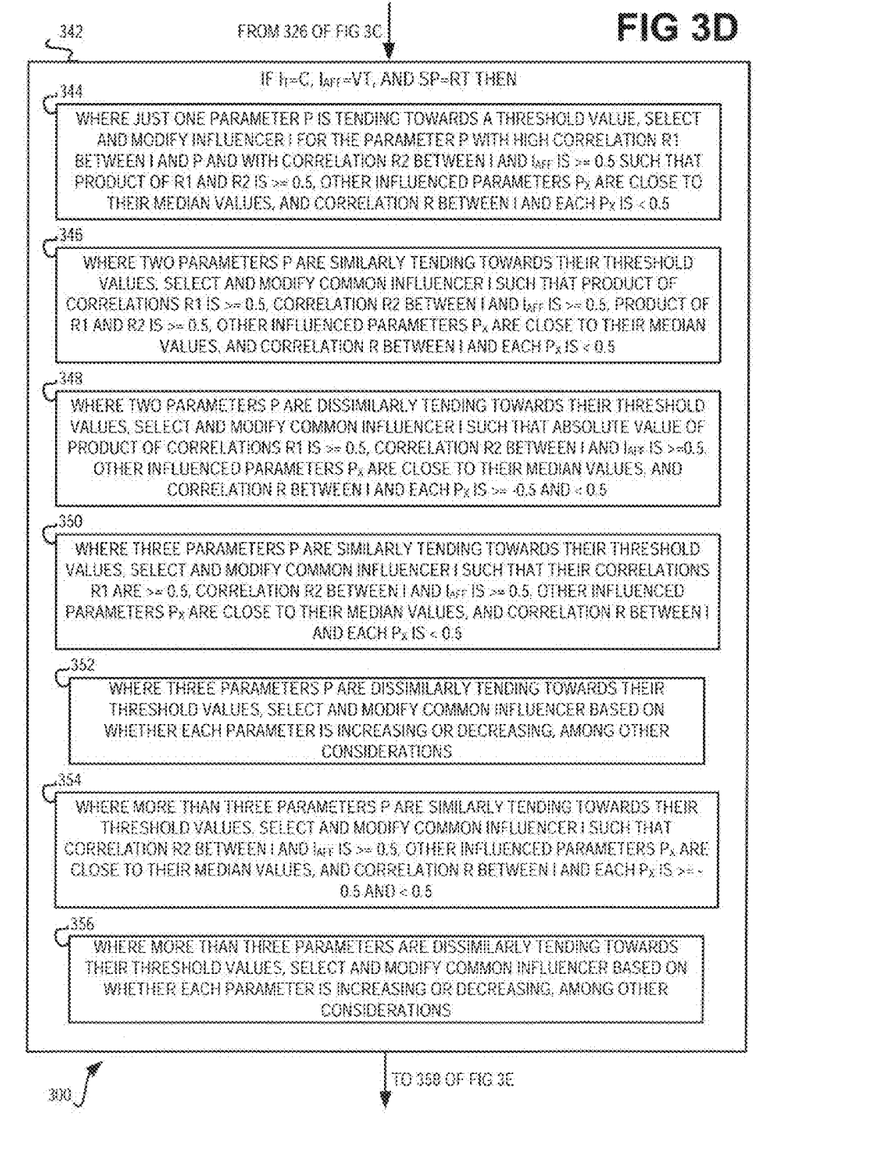
Figure 3E:
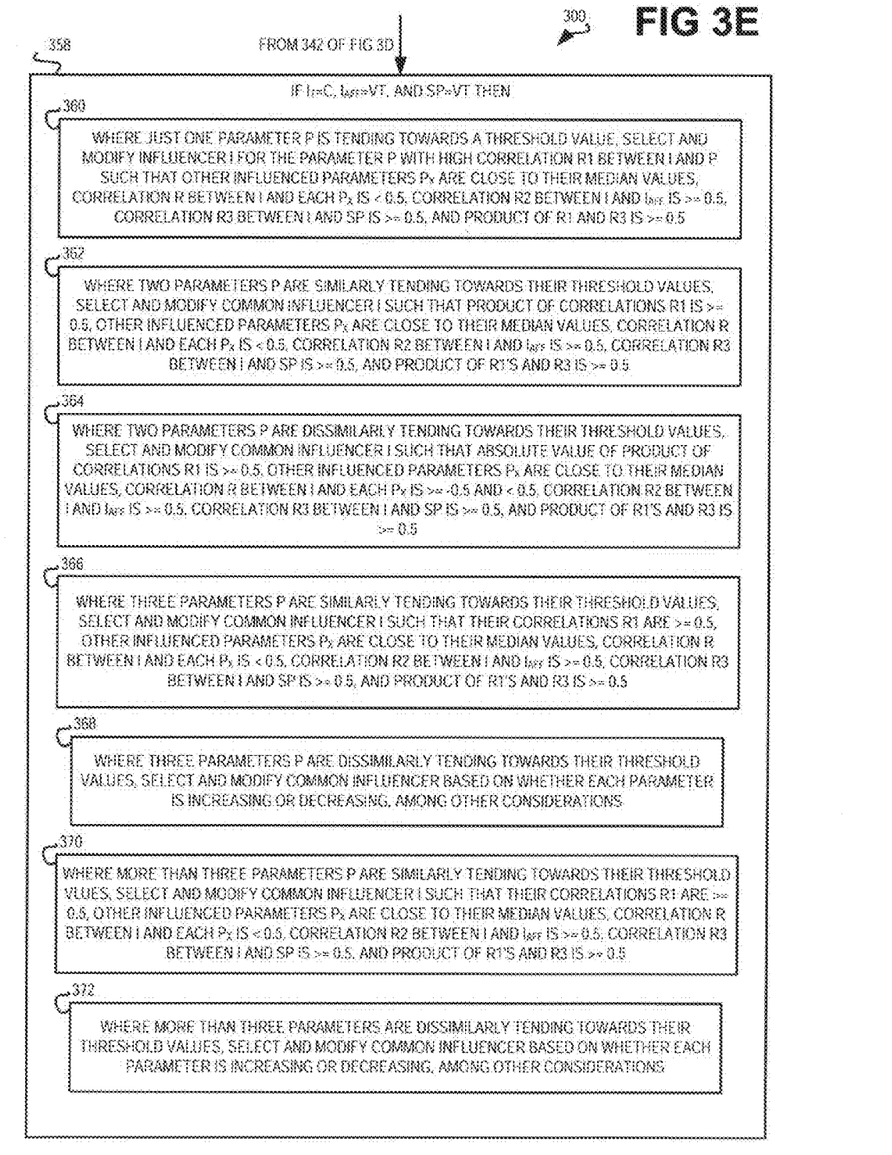

FIGS. 2A and 2B show a method 200, according to a parameters-only embodiment of the invention. The method 200, like other methods of embodiments of the invention, can be implemented by hardware of a computing device or system, such as one or more processors thereof, performing computer-readable instructions of one or more computer programs to effect the parts or steps of the method 200. The instructions and/or programs may be stored on a tangible computer-readable medium, such as a semiconductor, magnetic, and/or optical medium.

The method 200 receives two arguments SP and $P_{changed}$ (202), each of which can have the value of RT, specifying real time, or VT, specifying variable time. The argument SP indicates how the system and the parameters are affected (in real time or variable time), whereas $P_{changed}$ indicates how the parameters are changed (in real time or variable time). Thus, if the argument SP has a value of RT, then this means that the system and the parameters are affected in real time, and if the argument SP has a value of VT, then this means that the system and the parameters are affected in variable time. It is noted that it is possible that some parameters when changed affect the system in different times, based on the nature of the parameters in question, and the dynamics of the system.

For example, if $P_{changed}$ is equal to RT, then this means that once it is decided to change a parameter, it can be immediately changed, in real-time. By comparison, if $P_{changed}$ is equal to VT, then this means that once it is decided to change a parameter, it is changed at a subsequent variable time thereafter. As another example, if SP is equal to RT, then this means that once a first parameter affecting the system and second parameters are changed, the system and the second parameters are affected immediately, in real-time. By comparison, if SP is equal to VT, then this means that once a first parameter affecting the system and second parameters are changed, the system and the second parameters are affected at a subsequent variable time thereafter.

To explain this in a different way, presume that at time t0 it is decided that a first parameter is to be changed. If $P_{changed}$ is equal to RT, then the first parameter is changed at t0. Next, if $P_{changed}$ is equal to RT and SP is equal to RT, then the system and second parameters affected by the change in the first parameter at time t0 are also immediately affected (i.e., changed) at time t0. By comparison, if $P_{changed}$ is equal to RT and SP is equal to VT, then the system and second parameters affected by the change in the first parameter at time t0 are affected (i.e., changed) at time t1 greater than time t0. However, if $P_{changed}$ is equal to VT, then the first parameter is changed at time t2 greater than time t0, where times t1 and t2 are independent of one another. Next, if $P_{changed}$ is equal to VT and SP is equal to RT, then the system and second parameters affected by the change in the first parameter at time t2 are immediately affected at time t2. By comparison, if $P_{changed}$ and SP are both equal to VT, then the system and second parameters affected by the change in the first parameter at time t2 are affected (i.e., changed) at time t3 greater than time t2.

Parts 204, 206, 212, and 218 of the method 200 relate to adjusting one or more parameters that are each reaching one of their thresholds, based on values of SP and $P_{changed}$. For instance, if both the arguments SP and $P_{changed}$ are equal to RT, then the parameter P that is nearest to one of its threshold values is identified and adjusted (i.e., modified) so that it returns towards a median value (204). That is, the parameter $P_x$ that is nearest to one of its thresholds $T_{xmax}$ or $T_{xmin}$ is identified, and this parameter is adjusted so that it returns to a median (stable) value. That the parameter $P_x$ is adjusted so that it returns to a median value can also be expressed as the parameter $P_x$ being adjusted so that it returns to a more-normal value.

By comparison, if the argument SP equals RT while the argument $P_{changed}$ equals VT, then the following is repeated until no more parameters P exist that are near their threshold values, or until the correlation r between $P_{changed}$ and each parameter P is less than 0.5 (206). First, the parameter P that is nearest one of its threshold values is identified (208). Second, if the correlation r between $P_{changed}$ and this identified parameter P is greater than or equal to 0.5, then this parameter is adjusted (i.e., modified) so that it returns towards a median value (210). It is noted that a parameter $P_x$ may be considered near one of its threshold values where the value of the parameter is within a certain percentage of either $T_{xmax}$ or $T_{xmin}$.

Furthermore, if the argument SP equals VT while the argument $P_{changed}$ equals RT, then the following is repeated until no more parameters P exist that are near their threshold values, or until the correlation r between SP and each parameter P is less than 0.5 (212). First, the parameter P that is nearest one of its threshold values is identified (214). Second, if the correlation r between SP and this identified parameter P is greater than or equal to 0.5, then this parameter is adjusted (i.e., modified) so that it returns towards a median value (216).

Finally, if both the arguments SP and $P_{changed}$ are equal to RT, then the following is repeated until no more parameters P exist that are near their threshold values, or until the correlation r between $P_{changed}$ and each parameter P is greater than or equal to 0.5 and the correlation r between SP and each parameter P is greater than or equal to 0.5 (218). First, the parameter P that is nearest one of its threshold values is identified (220). Second, if the correlation r between $P_{changed}$ and this identified parameter P is less than 0.5 and the correlation r between SP and this identified parameter P is less than 0.5, then this parameter is adjusted (i.e., modified) so that it returns towards a median value (222).

Parameters and Influencers Embodiments

In second embodiments of the invention, the system 100 of FIG. 1 includes both parameters 102 and influencers 104. Thus, the system 100 is implemented using correlation between the parameters 102 and the influencers 104 of the system 100. The parameters 102, as in the previous parameters-only embodiments, can affect the entire system 100, but not any individual autonomic elements of the system. Statistical-based correlation techniques are employed to identify the relationships between the parameters 102 and the system 100, and also between the parameters 102 and the influencers 104.

In mathematical terms, the daemon 106 monitors the values of the parameters 102 in the system 100, where there are n parameters P: $P_1, P_2, \ldots, P_n$. Each parameter $P_x$ also has two thresholds. The first threshold is a minimum threshold $T_{xmin}$ corresponding to the minimum value of the parameter $P_x$, and the second threshold is a maximum threshold $T_{xmax}$ corresponding to the maximum value of the parameter $P_x$. Each parameter $P_x$ further has influencers I. Thus, for $P_1$ there are influencers $I_{p1}$ through $I_{pm}$, for example.

In this system 100, when a given parameter $P_1$ approaches $T_{p1min}$ or $T_{p1max}$, then the influences for $P_1$ are modified by the system 100 automatically by receiving a trigger from the daemon so that $P_1$ stays within its boundary values. That is, the influencers in question are modified in such a way that $P_1$ changes towards its median value. The influencers are assumed to be able to be modified in a non-intrusive manner.

The correlation r between two variables x and y is given by Equation (1) in the previous section of the detailed description. As noted above, in Equation (1), n is the number of the pairs of data. The value of r lies between −1 and 1. If the value of r is positive, there is positive correlation, and if the value of r is negative then there is negative correlation. The closer the value of r is to 1, the closer the (positive) correlation.

In complex systems, where there are many parameters and many data points, a clear dependency among the parameters may not be apparent. As such, the correlation coefficient is an effective way of identifying dependencies. By changing one data point, the other data point can be influenced.

In a model employing both parameters and influencers, eight scenarios are considered, based on three variables: whether a given influencer is distinct or common, whether the influencers of the system are affected in real time or variable time, and whether the system and the parameters are affected in real time or variable time. An influencer is said to be distinct where adjustment of the influencer affects the value of only one of the parameters. By comparison, an influencer is said to be common where adjustment of the influencer affects the values of more than one of the parameters. Since there are three variables that each may take on one of two different values, there are $2^3=8$ different scenarios.

As noted in the previous section of the detailed description, the terminology "real time" means that the change or affectation in question occurs immediately. For example, when it is decided that a parameter is to be changed, if the parameter can be changed in real time, then the parameter is changed immediately. Likewise, a first parameter that is affected in real time means that when a second parameter on which the first parameter is dependent is changed, the first parameter is immediately affected.

By comparison, as also noted in the previous section of the detailed description, the terminology "variable time" means that the change or affectation in question does not occur immediately, but rather it takes a given amount of variable time before the effects of the change or affectation are actually evidenced or seen in the parameter. For example, when it is decided that a parameter is to be changed, if the parameter is changed in variable time, then the change in the parameter is seen after a length of variable time has elapsed. Likewise, a first parameter that is affected in variable time means that when a second parameter on which the first parameter is dependent is changed, the first parameter is affected after a length of variable time has elapsed. Thus, the response time in change or affectation can be variable (i.e., being a "variable" time), as opposed to being static.

In the eight scenarios of these embodiments of the invention, the parameters $P_1, P_2, \ldots, P_n$, are the n parameters that control the steady state of the system in question. Thus, for instance, $P_1$ has a set of numerical values over different instances of time during steady state, denoted as $P_1=\{P_{1v1}, P_{1v2}, \ldots, P_{1vn}\}$. There is further an interface that permits the values of the influencers to be changed. Furthermore, due to the dynamics of the system, the influencers are actually affected at time $I_{aff}$ and the parameters or the system is actually affected at time SP. It is assumed that historical values of P, $I_{aff}$, and SP are available to the system, or obtained over a period of steady state of the system.

FIGS. 3A, 3B, 3C, 3D, and 3E show a method 300, according to a parameters-and-influencers embodiment of the invention. The method 300 receives three arguments $I_t$, $I_{aff}$, and SP (302). The argument $I_t$ indicates the type of the influencer in question, as either distinct (D) or common (C). The argument $I_{aff}$ indicates whether the influencers are affected (i.e., changed) in real time (RT) or variable time (VT), similar to the manner by which the parameters are changed ($P_{changed}$) as described in the preceding section of the detailed description. Likewise, the argument SP indicates whether the system and the parameters are affected in real time (RT) or variable time (VT).

If $I_t$ is equal to D, $I_{aff}$ is equal to RT, and SP is equal to RT, then the method 300 selects (i.e., identifies) an influencer I of parameter P that is tending towards one of its threshold values (i.e., the parameter P is increasing towards its maximum threshold value or is decreasing towards its minimum threshold value, while other parameters are at steady or equilibrium states) and where the correlation r between I and P is the highest (304). This influencer I is then modified so that the parameter P returns towards a median value; that is, so that the parameter P returns to a more-normal value. That is, the influencer I is selected such that the parameter P that the influencer I selects is tending towards one of its threshold values, and such that the correlation r between I and P is the highest.

If $I_t$ is equal to D, $I_{aff}$ is equal to RT, and SP is equal to VT, then the method 300 selects an influencer I of parameter P that is tending towards one of its threshold values, where the correlation r1 between I and P is greater than or equal to 0.5, the correlation r2 between I and SP is greater than or equal to 0.5, and the product of R1 and R2 is the highest (306). The influencer I is then modified so that the parameter P returns towards a median value, which is a more-normal value of the parameter P.

If $I_t$ is equal to D, $I_{aff}$ is equal to VT, and SP is equal to RT, then the method 300 selects an influencer I of parameter P that is tending towards one of its threshold values, where the correlation r1 between I and $I_{aff}$ is greater than or equal to 0.5, the correlation r2 between I and P is greater than or equal to 0.5, and the product of R1 and R2 is the highest (308). The influencer I is then modified so that the parameter P returns towards a median value, which is a more-normal value of the parameter P.

If $I_t$ is equal to D, $I_{aff}$ is equal to VT, and SP is equal to VT, then the method 300 selects an influencer I of parameter P that is tending towards one of its threshold values, where the correlations R1, R2, and R3 are all greater than or equal to 0.5, and the product of R1, R2, and R3 is the highest (310). The correlation r1 is between I and P, the correlation r2 is between I and $I_{aff}$, and the correlation r3 is between I and SP. The influencer I is then modified so that the parameter P returns towards a median value, which is a more-normal value of the parameter P.

Next, if $I_t$ is equal to C, $I_{aff}$ is equal to RT, and SP is equal to RT, then the method 300 performs the following (311). If just one parameter P is tending towards one of its threshold values, the method 300 selects an influencer I for the parameter P with a high correlation r between I and P, such that the other parameters $P_x$ influenced by the influencer I are close to their median values, and the correlation r between I and each $P_x$ is <0.5 (312). A high correlation r between the influencer I and the parameter P can mean that the absolute value of R is greater than or equal to 0.5 in one embodiment. Likewise, that a parameter $P_x$ is close to its median value can mean that the value of $P_x$ is within 20% or so of its median value in varying embodiments. The common influencer I is modified (i.e., adjusted) so that the parameter P in question returns to a median, more-normal value.

By comparison, where two parameters P are similarly tending towards their threshold values (i.e., where both parameters are increasing towards their maximum threshold values, or both are decreasing towards their minimum threshold values), a common influencer I to both parameters P is selected and modified (i.e., adjusted) as follows (314). The influencer I is selected such that the product of the correlation r between I and the first parameter P and the correlation r between I and the second parameter P is >=0.5, such that the other parameters $P_x$ influenced by this influencer I are close to their median values, and such that the correlation r between I and each $P_x$ is <0.5. The common influencer I is then modified, or adjusted, so that the parameters P in question return to median, more-normal values.

Where two parameters P are dissimilarly tending towards their threshold values (i.e., where one parameter is increasing towards its maximum threshold value and the other parameter is decreasing towards its minimum threshold value), a common influencer I to both parameters P is selected and modified (i.e., adjusted) as follows (316). The influencer I is selected such that the product of the correlation r between I and the first parameter P and the correlation r between I and the second parameter P is greater than 0.5, such that the other parameters $P_x$ influenced by this influencer I are close to their median values, and such that the correlation r between I and each $P_x$ is <0.5 and >=−0.5. The common influencer I is then modified, or adjusted, so that the parameters P in question return to median, more-normal values.

Where three parameters are similarly tending towards their threshold values (i.e., where all three parameters are increasing towards their maximum threshold values or are decreasing towards their minimum threshold values), a common influencer I to all three parameters P is selected and modified (i.e., adjusted) as follows (318). The influencer I is selected such that the correlation R between I and each parameter P is >=0.5, such that other parameters $P_x$ influenced by this influencer I are close to their median values, and such that the correlation r between I and each $P_x$ is <0.5. The common influencer I is then modified, or adjusted, so that the parameters P in question return to median, more-normal values.

Where three parameters are dissimilarly tending towards their threshold values (i.e., where two parameters are increasing towards their maximum threshold values and one parameter is decreasing towards its minimum threshold value, or vice-versa), a common influencer I to all three parameters P is selected and modified (i.e., adjusted) based on whether each parameter is increasing or decreasing, as follows (320). Where the three parameters are referred to as $P_1$, $P_2$, and $P_3$, they can each be increasing (↑) towards it maximum value or decreasing (↓) towards its minimum value. Furthermore, the correlation $R_{xy}$ between any two of these parameters 1, 2, and 3 can be positive (+ve) or negative (−ve). As such, there can be up to $2^3=8$ different common influencers from which a given common influencer is selected, depending on how the parameters are increasing or decreasing, and depending on the values of the correlations $R_{xy}$, as follows:

$P_1$(↑), $P_2$(↑), $P_3$(↑), $R_{11}$(+ve), $R_{12}$(+ve), and $R_{13}$(+ve)
$P_1$(↑), $P_2$(↑), $P_3$(↓), $R_{11}$(+ve), $R_{12}$(+ve), and $R_{13}$(−ve)
$P_1$(↑), $P_2$(↓), $P_3$(↑), $R_{11}$(+ve), $R_{12}$(−ve), and $R_{13}$(+ve)
$P_1$(↑), $P_2$(↓), $P_3$(↓), $R_{11}$(+ve), $R_{12}$(−ve), and $R_{13}$(−ve)
$P_1$(↓), $P_2$(↑), $P_3$(↑), $R_{11}$(−ve), $R_{12}$(+ve), and $R_{13}$(+ve)
$P_1$(↓), $P_2$(↑), $P_3$(↓), $R_{11}$(−ve), $R_{12}$(+ve), and $R_{13}$(−ve)
$P_1$(↓), $P_2$(↓), $P_3$(↑), $R_{11}$(−ve), $R_{12}$(−ve), and $R_{13}$(+ve)
$P_1$(↓), $P_2$(↓), $P_3$(↓), $R_{11}$(−ve), $R_{12}$(−ve), and $R_{13}$(−ve)

The influencer I is further selected to ensure that any other parameters influenced by this influencer is close to its median value and that the correlation r between each of these parameters and the influencer is such that −0.5<=r<=0.5. This common influencer I is then modified, or adjusted, so that the parameters P in question return to median, more-normal values.

Where more than three parameters are similarly tending towards their threshold values (i.e., where all the parameters are increasing towards their maximum threshold values or are decreasing towards their minimum threshold values), a common influencer I to all these parameters $P_y$ is selected and modified (i.e., adjusted) as follows (322). The influencer I is selected such that the product of the correlation r of I and each $P_y$ is >=0.5, such that other parameters $P_x$ influenced by this influencer I are close to their median values, and such that the correlation r of I and each $P_x$ is <0.5. For example, where there are four parameters $P_y=P_1, P_2, P_3$, and $P_4$, the product of the correlation r of I and each $P_y$ is equal to the correlation r of I and $P_1$, times the correlation r of I and $P_2$, times the correlation r of I and $P_3$, times the correlation r of I and $P_4$. The common influencer I that is selected is then modified, or adjusted, so that the parameters $P_y$ in question return to media, more-normal values.

Where more than three parameters are dissimilarly tending towards their threshold values (i.e., at least one parameter is increasing towards its maximum threshold value and at least one parameter is decreasing towards its minimum threshold value), a common influencer I to all these parameters $P_y$ is selected and modified (i.e., adjusted) based on whether each parameter is increasing or decreasing, as follows (324). Where the number of parameters $P_y$ is equal to n, it is noted that there are $2^n$ different cases, which is the more general case encompassing the case where n=3, as has been described in relation to part 320 above. Each of the parameters P can be increasing towards its maximum value or decreasing towards its minimum value. The correlation $R_{xy}$ between any two of these can be positive (+ve) or negative (−ve). An influencer I is selected depending on how the parameters are increasing or decreasing, and depending on the values of the correlations $R_{xy}$, as has been described above in the particular case where n=3. The influencer I is further selected to ensure that any other parameters influenced by this influencer is close to its median value and that the correlation r between each of these parameters and the influencer is such that $-0.5<=r<=0.5$. The common influencer I is then modified, or adjusted, so that the parameters P in question return to median, more-normal values.

Next, if $I_t$ is equal to C, $I_{aff}$ is equal to RT, and SP is equal to VT, then the method 300 performs the following (326). If just one parameter P is tending towards one of its threshold values, the method 300 selects and modifies (i.e., adjusts) an influencer I for the parameter P as follows (328). Specifically, the influencer I is selected such that there is high correlation r1 between I and the parameter P, such that other parameters $P_x$ influenced by I are close to their median values, such that the correlation r between I and each $P_x$ is <0.5, such that the correlation r2 between I and SP is >=0.5, and such that the product of r1 and r2 is <=0.5. The common influencer I is modified (i.e., adjusted) so that the parameter P in question returns to a median, more-normal value.

If two parameters P are similarly tending towards their threshold values, a common influencer I to both parameters P is selected and modified (i.e., adjusted) as follows (330). The common influencer I for both parameters P is selected such that the product of both the correlations r1 is >=0.5, other parameters $P_x$ influenced by I are close to their median values, the correlation r between I and each $P_x$ is <0.5, the correlation r2 between I and SP is >=0.5, and the product of both the correlations r1 and r2 is >=0.5. Where the parameters P include the parameters $P_1$ and $P_2$, for instance, there is one correlation r1 between I and $P_1$, and there is another correlation r1 between I and $P_2$. The product of both these correlations is equal to the correlation r1 between I and $P_1$, times the correlation r1 between I and $P_2$. The product of both these correlations and r2 is the correlation r1 between I and $P_1$, times the correlation r1 between I and $P_2$, times the correlation r2 between I and SP. The common influencer I is modified (i.e., adjusted) so that the parameters P in question return to median, more-normal values.

If two parameters are dissimilarly tending towards their threshold values, a common influencer I to both parameters P is selected and modified (i.e., adjusted) as follows (332). The common influencer I is selected such that the product of both the correlations r1 is >=0.5, other parameters $P_x$ influenced by I are close to their median values, the correlation r between I and each $P_x$ is <=0.5 and >=−0.5, the correlation r2 between I and SP is >=0.5, and the product of both the correlations r1 and r2 is >=0.5. The common influencer I is modified (i.e., adjusted) so that the parameters P in question return to median, more-normal values.

If three parameters P are similarly tending towards their threshold values, a common influencer I to all three parameters P is selected and modified (i.e., adjusted) as follows (334). The common influencer I is selected such that all their correlations r1 are >=0.5, other parameters $P_x$ influenced by I are close to their median values, the correlation r between I and each $P_x$ is <=0.5, the correlation r2 between I and SP is >=0.5, and the product of all the correlations r1 and r2 is >=0.5. The common influencer I is modified (i.e., adjusted) so that the parameters P in question return to median, more-normal values.

If three parameters are dissimilarly tending towards their threshold values, a common influencer I to all three parameters is selected and modified (i.e., adjusted) based on whether each parameter is increasing or decreasing, as follows (336). It is noted that there are six scenarios in this case. Where the three parameters are referred to as $P_1$, $P_2$, and $P_3$, they can each be increasing (↑) towards it maximum value or decreasing (↓) towards its minimum value. Furthermore, the correlation $R_{xy}$ between any two of these parameters 1, 2, and 3 can be positive (+ve) or negative (−ve). As such, there can be up to $2^3=8$ different common influencers from which a given common influencer is selected, depending on how the parameters are increasing or decreasing, and depending on the values of the correlations $R_{xy}$, as follows:

$P_1(↑), P_2(↑), P_3(↑), R_{11}(+ve), R_{12}(+ve)$, and $R_{13}(+ve)$
$P_1(↑), P_2(↑), P_3(↓), R_{11}(+ve), R_{12}(+ve)$, and $R_{13}(-ve)$
$P_1(↑), P_2(↓), P_3(↑), R_{11}(+ve), R_{12}(-ve)$, and $R_{13}(+ve)$
$P_1(↑), P_2(↓), P_3(↓), R_{11}(+ve), R_{12}(-ve)$, and $R_{13}(-ve)$
$P_1(↓), P_2(↑), P_3(↑), R_{11}(-ve), R_{12}(+ve)$, and $R_{13}(+ve)$
$P_1(↓), P_2(↑), P_3(↓), R_{11}(-ve), R_{12}(+ve)$, and $R_{13}(-ve)$
$P_1(↓), P_2(↓), P_3(↑), R_{11}(-ve), R_{12}(-ve)$, and $R_{13}(+ve)$
$P_1(↓), P_2(↓), P_3(↓), R_{11}(-ve), R_{12}(-ve)$, and $R_{13}(-ve)$ The influencer $I_z$ is further selected such that other parameters $P_x$ influenced by this influencer I are close to their median values, such that the correlation r between I and each $P_x$ is <=0.5 and >=−0.5, such that the correlation r2 between I and SP is >=0.5, and such that the product of all the correlations r1 and r2 is >=0.5. It is noted that for each $P_y$ (y=1, 2, or 3) of the three parameters P, there is a corresponding correlation r1 between I and $P_y$ (y=1, 2, or 3). This common influencer I is then modified, or adjusted, so that the parameters P in question return to median, more-normal values.

If more than three parameters are similarly tending towards their threshold values, a common influencer I to all these parameters P is selected and modified (i.e., adjusted) as follows (338). The influencer I is selected such that all the correlations r1 (where each correlation r1 is between I and one of the parameters P)>=0.5, other parameters $P_x$ influenced by the influencer I are close to their median values, the correlation r between I and each $P_x$ is <=0.5, the correlation r2 between I and SP is <=0.5, and the product of all the correlations r1 and r2 is >=0.5. The common influencer I is then modified, or adjusted, so that the parameters P in question return to media, more-normal values.

If more than three parameters are dissimilarly tending towards their threshold values, a common influencer I to all these parameters P is selected and modified (i.e., adjusted) based on whether each parameter is increasing or decreasing, as follows (340). Where the number of parameters $P_y$ is equal to n, it is noted that there are $2^n$ different cases, which is the more general case encompassing the case where n=3, as has been described in relation to part 336 above. Each of the parameters P can be increasing towards its maximum value or decreasing towards its minimum value. The correlation $R_{xy}$ between any two of these can be positive (+ve) or negative (-ve). An influencer I is selected depending on how the parameters are increasing or decreasing, and depending on the values of the correlations $R_{xy}$, as has been described above in the particular case where n=3. The influencer I is further selected such that other parameters $P_x$ influenced by this influencer I are close to their median values, such that the correlation r between I and each $P_x$ is <=0.5 and >=−0.5, such that the correlation r2 between I and SP is >=0.5, and the product of all the correlations r1 and r2 is >=0.5. It is noted that for each $P_y$ (y=1, 2, 3, . . . , n) of the parameters P, there is a corresponding correlation r1 between I and $P_y$ (y=1, 2, 3, . . . , n). The common influencer I is then modified, or adjusted, so that the parameters $P_y$ in question return to median, more-normal values.

Next, if $I_t$ is equal to C, $I_{aff}$ is equal to RT, and SP is equal to VT, then the method 300 performs the following (342). If just one parameter is tending towards one of its threshold values, the method 300 selects and modifies (i.e., adjusts) an influencer I for the parameter P as follows (344). Specifically, the influencer I is selected such that there is a high correlation r1 between I and P, such that the correlation r2 between I and $I_{aff}$ is >=0.5, a product of r1 and r2 is >=0.5, such that other parameters $P_x$ influenced by I are close to their median values, and such that the correlation r between I and each $P_x$ is <0.5. The common influencer I is modified so that the parameter P in question returns to a median, more-normal value.

If two parameters P are similarly tending towards their threshold values, a common influencer I to both parameters P is selected and modified (i.e., adjusted) as follows (346). The common influencer I for both parameters P is selected such that the product of both the correlations r1 is >=0.5, the correlation r2 between I and $I_{aff}$ is >=0.5, the product of both the correlations r1 and r2 is >=0.5, other parameters $P_x$ influenced by I are close to their median values, and the correlation r between I and each $P_x$ is <0.5. Where the parameters P include the parameters $P_1$ and $P_2$, for instance, there is one correlation r1 between I and $P_1$, and there is another correlation r1 between I and $P_2$. The common influencer I is modified (i.e., adjusted) so that the parameters P in question return to median, more-normal values.

If two parameters P are dissimilarly tending towards their threshold values, a common influencer I to both parameters P is selected and modified (i.e., adjusted) as follows (348). The common influencer I is selected such that the absolute value of the product of both the correlations r1 is >=0.5, the correlation r2 between I and $I_{aff}$ is >=0.5, other parameters $P_x$ influenced by I are close to their median values, and the correlation r between I and each $P_x$ is <0.5. The common influencer I is modified (i.e., adjusted) so that the parameters P in question return to median, more-normal values.

If three parameters P are similarly tending towards their threshold values, a common influencer I to all three parameters P is selected and modified (i.e., adjusted) as follows (350). The common influencer I is selected such that the correlations r1 are each >=0.5, the correlation r2 between I and $I_{aff}$ is >=0.5, other parameters $P_x$ influenced by I are close to their median values, and the correlation r between I and each $P_x$ is <0.5. The common influencer I is modified (i.e., adjusted) so that the parameters P in question return to median, more-normal values.

If three parameters are dissimilarly tending towards their threshold values, a common influencer I to all three parameters is selected and modified (i.e., adjusted) based on whether each parameter is increasing or decreasing, as follows (352). Where the three parameters are referred to as $P_1$, $P_2$, and $P_3$, they can each be increasing (↑) towards it maximum value or decreasing (↓) towards its minimum value. Furthermore, the correlation $R_{xy}$ between any two of these parameters 1, 2, and 3 can be positive (+ve) or negative (−ve). As such, there can be up to $2^3$=8 different common influencers from which a given common influencer is selected, depending on how the parameters are increasing or decreasing, and depending on the values of the correlations $R_{xy}$, as follows:

$P_1$(↑), $P_2$(↑), $P_3$(↑), $R_{11}$(+ve), $R_{12}$(+ve), and $R_{13}$(+ve)
$P_1$(↑), $P_2$(↑), $P_3$(↓), $R_{11}$(+ve), $R_{12}$(+ve), and $R_{13}$(−ve)
$P_1$(↑), $P_2$(↓), $P_3$(↑), $R_{11}$(+ve), $R_{12}$(−ve), and $R_{13}$(+ve)
$P_1$(↑), $P_2$(↓), $P_3$(↓), $R_{11}$(+ve), $R_{12}$(−ve), and $R_{13}$(−ve)
$P_1$(↓), $P_2$(↑), $P_3$(↑), $R_{11}$(−ve), $R_{12}$(+ve), and $R_{13}$(+ve)
$P_1$(↓), $P_2$(↑), $P_3$(↓), $R_{11}$(−ve), $R_{12}$(+ve), and $R_{13}$(−ve)
$P_1$(↓), $P_2$(↓), $P_3$(↑), $R_{11}$(−ve), $R_{12}$(−ve), and $R_{13}$(+ve)
$P_1$(↓), $P_2$(↓), $P_3$(↓), $R_{11}$(−ve), $R_{12}$(−ve), and $R_{13}$(−ve)

The influencer I is further selected such that other parameters $P_x$ influenced by this influencer I are close to their median values, such that the correlation r between I and each $P_x$ is <=0.5 and >=−0.5, and such that the correlation r2 between I and $I_{aff}$ is >=0.5. It is noted that for each $P_y$ (y=1, 2, or 3) of the three parameters P, there is a corresponding correlation r1 between I and $P_y$ (y=1, 2, or 3). This common influencer I is then modified, or adjusted, so that the parameters P in question return to median, more-normal values.

If more than three parameters are similarly tending towards their threshold values, a common influencer I to all these parameters P is selected and modified (i.e., adjusted) as follows (354). The influencer I is selected such that the correlation r2 between I and $I_{aff}$ is >=0.5, other parameters $P_x$ influenced by I are close to their median values, and the correlation r between I and each $P_x$ is >=−0.5 and <0.5. The common influencer I is then modified, or adjusted, so that the parameters P in question return to median, more-normal values.

If more than three parameters are dissimilarly tending towards their threshold values, a common influencer I to all these parameters P is selected and modified (i.e., adjusted) based on whether each parameter is increasing or decreasing, as follows (356). Where the number of parameters $P_y$ is equal to n, it is noted that there are $2^n$ different cases, which is the more general case encompassing the case where n=3, as has been described in relation to part 352 above. Each of the parameters P can be increasing towards its maximum value or decreasing towards its minimum value. The correlation $R_{xy}$ between any two of these can be positive (+ve) or negative (−ve). An influencer I is selected depending on how the parameters are increasing or decreasing, and depending on the values of the correlations $R_{xy}$, as has been described above in the particular case where n=3. The influencer I is further selected such that other parameters $P_x$ influenced by this influencer I are close to their median values, such that the correlation r between I and each $P_x$ is <=0.5 and >=−0.5, and such that the correlation r2 between I and $I_{aff}$ is >=0.5. It is noted that for each $P_y$ (y=1, 2, 3, . . . , n) of the parameters P, there is a corresponding correlation r1 between I and $P_y$ (y=1, 2, 3, . . . , n). The common influencer I is then modified, or adjusted, so that the parameters $P_y$ in question return to median, more-normal values.

Finally, if $I_t$ is equal to C, $I_{aff}$ is equal to VT, and SP is equal to VT, then the method 300 performs the following (358). If just one parameter P is tending towards one of its threshold values, then the method 300 selects and modifies (i.e., adjusts) an influencer I for the parameter P as follows (360). Specifically, the influencer I is selected such that there is a high correlation r1 between I and P, such that other parameters $P_x$ influenced by I are close to their median values, such that the correlation r between I and each $P_x$ is <0.5, such that the correlation r2 between I and $I_{\it aff}$ is >=0.5, such that the correlation r3 between I and SP is >=0.5, and such that the product of r1 and r3 is >=0.5. The common influencer I is modified so that the parameter P in question returns to a median, more-normal value.

If two parameters P are similarly tending towards their threshold values, a common influencer I to both parameters P is selected and modified (i.e., adjusted) as follows (362). The common influencer I for both parameters P is selected such that the product of both the correlations is >=0.5, other parameters $P_x$ influenced by I are close to their median values, the correlation r between I and each $P_x$ is <0.5, the correlation r2 between I and $I_{\it aff}$ is >=0.5, the correlation r3 between I and SP is >=0.5, and the product of both the correlations r1 and r3 is >=0.5. Where the parameters P include the parameters $P_1$ and $P_2$, for instance, there is one correlation r1 between I and $P_1$, and there is another correlation r1 between I and $P_2$. The common influencer I is modified (i.e., adjusted) so that the parameters P in question return to median, more-normal values.

If two parameters P are dissimilarly tending towards their threshold values, a common influencer I to both parameters P is selected and modified (i.e., adjusted) as follows (364). The common influencer I is selected such that the absolute value of the product of both the correlations r1 is >=0.5, other parameters $P_x$ influenced by I are close to their median values, the correlation r between I and each $P_x$ is >=−0.5 and <0.5, the correlation r2 between I and $I_{\it aff}$ is >=0.5, the correlation r3 between I and SP is >=0.5, and the product of both the correlations r1 and r3 is >=0.5. The common influencer I is modified (i.e., adjusted) so that the parameters P in question return to median, more-normal values.

If three parameters P are similarly tending towards their threshold values, a common influencer I to all three parameters P is selected and modified (i.e., adjusted) as follows (366). The common influencer I is selected such that the correlations r1 are each >=0.5, the correlation r2 between I and $I_{\it aff}$ is >=0.5, other parameters $P_x$ influenced by I are close to their median values, the correlation r between I and each $P_x$ is <0.5, the correlation r3 between I and SP is >=0.5, and the product of all the correlations r1 and r3 is >=0.5. The common influencer I is modified (i.e., adjusted) so that the parameters P in question return to median, more-normal values.

If three parameters are dissimilarly tending towards their threshold values, a common influencer I to all three parameters is selected and modified (i.e., adjusted) based on whether each parameter is increasing or decreasing, as follows (368). It is noted that there are six scenarios in this case. Where the three parameters are referred to as $P_1$, $P_2$, and $P_3$, they can each be increasing (↑) towards it maximum value or decreasing (↓) towards its minimum value. Furthermore, the correlation $R_{xy}$ between any two of these parameters 1, 2, and 3 can be positive (+ve) or negative (−ve). As such, there can be up to $2^3=8$ different common influencers from which a given common influencer is selected, depending on how the parameters are increasing or decreasing, and depending on the values of the correlations $R_{xy}$, as follows:

$P_1(↑)$, $P_2(↑)$, $P_3(↑)$, $R_{11}(+ve)$, $R_{12}(+ve)$, and $R_{13}(+ve)$
$P_1(↑)$, $P_2(↑)$, $P_3(↓)$, $R_{11}(+ve)$, $R_{12}(+ve)$, and $R_{13}(-ve)$
$P_1(↑)$, $P_2(↓)$, $P_3(↑)$, $R_{11}(+ve)$, $R_{12}(-ve)$, and $R_{13}(+ve)$
$P_1(↑)$, $P_2(↓)$, $P_3(↓)$, $R_{11}(+ve)$, $R_{12}(-ve)$, and $R_{13}(-ve)$
$P_1(↓)$, $P_2(↑)$, $P_3(↑)$, $R_{11}(-ve)$, $R_{12}(+ve)$, and $R_{13}(+ve)$
$P_1(↓)$, $P_2(↑)$, $P_3(↓)$, $R_{11}(-ve)$, $R_{12}(+ve)$, and $R_{13}(-ve)$
$P_1(↓)$, $P_2(↓)$, $P_3(↑)$, $R_{11}(-ve)$, $R_{12}(-ve)$, and $R_{13}(+ve)$
$P_1(↓)$, $P_2(↓)$, $P_3(↓)$, $R_{11}(-ve)$, $R_{12}(-ve)$, and $R_{13}(-ve)$ The influencer I is further selected such that other parameters $P_x$ influenced by this influencer I are close to their median values, such that the correlation r between I and each $P_x$ is <=0.5 and >=−0.5, such that the correlation r2 between I and SP is >=0.5, and such that the correlation r3 between I and $I_{\it aff}$ is >=0.5. It is noted that for each $P_y$ (y=1, 2, or 3) of the three parameters P, there is a corresponding correlation r1 between I and $P_y$ (y=1, 2, or 3). This common influencer I is then modified, or adjusted, so that the parameters P in question return to median, more-normal values.

If more than three parameters are similarly tending towards their threshold values, a common influencer I to all these parameters P is selected and modified (i.e., adjusted) as follows (370). The influencer I is selected such that the correlation r1 between I and each parameter P is >=0.5, other parameters $P_x$ influenced by I are close to their median values, the correlation r between I and each parameter $P_x$ is <0.5, the correlation r2 between I and $I_{\it aff}$ is >=0.5, the correlation r3 between I and SP is >=0.5, and the products of all the correlations r1 and r3 is >=0.5. The common influencer I is then modified, or adjusted, so that the parameters P in question return to median, more-normal-values.

If more than three parameters are dissimilarly tending towards their threshold values, a common influencer I to all these parameters P is selected and modified (i.e., adjusted) based on whether each parameter is increasing or decreasing, as follows (372). Where the number of parameters $P_y$ is equal to n, it is noted that there are $2^n$ different cases, which is the more general case encompassing the case where n=3, as has been described in relation to part 368 above. Each of the parameters P can be increasing towards its maximum value or decreasing towards its minimum value. The correlation $R_{xy}$ between any two of these can be positive (+ve) or negative (−ve). An influencer I is selected depending on how the parameters are increasing or decreasing, and depending on the values of the correlations $R_{xy}$, as has been described above in the particular case where n=3. The influencer I is further selected such that other parameters $P_x$ influenced by this influencer I are close to their median values, such that the correlation r between I and each $P_x$ is <=0.5 and >=−0.5, such that the correlation r2 between I and SP is >=0.5, and such that the correlation r3 between I and $I_{\it aff}$ is >=0.5. It is noted that for each $P_y$ (y=1, 2, 3, . . . , n) of the parameters P, there is a corresponding correlation r1 between I and $P_y$ (y=1, 2, 3, . . . , n). The common influencer I is then modified, or adjusted, so that the parameters $P_y$ in question return to median, more-normal values.

CONCLUSION

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

I claim:
1. A method for automatically maintaining an autonomic computing system in a steady state, the autonomic computing system having a plurality of parameters, each parameter having one or more thresholds, the method comprising:

receiving by one or more hardware devices a value of a first variable specifying how the parameters are changed once a decision has been made to change the parameters, the value of the first variable being one of real time and variable time;

receiving by the hardware devices a value of a second variable specifying how the system and the parameters are affected responsive to a change in the parameters, the value of the second variable being one of real time and variable time; and, adjusting by the hardware devices one or more of the parameters that are each reaching one of the thresholds of the parameter, based on the values of the first variable and the second variable, the one or more of the parameters referred to as to-be-affected parameters, so that the to-be-affected parameters are no longer reaching the thresholds.

2. The method of claim 1, wherein adjusting the to-be-affected parameters comprises:

where the value of the first variable is equal to real time and the value of the second variable is equal to real time, identifying and modifying a given parameter that is nearest to one of the thresholds of the given parameter.

3. The method of claim 1, wherein adjusting the to-be-affected parameters comprises:

where the value of the first variable is equal to variable time and the value of the second variable is equal to real time, repeating:

identifying a given parameter that is nearest to one of the thresholds of the given parameter;

where a correlation between the first variable and the given parameter is greater than or equal to 0.5, modifying the given parameter, until no more parameters are near the thresholds, or until a correlation between the first variable and each parameter near one of the thresholds is less than 0.5.

4. The method of claim 1, wherein adjusting the to-be-affected parameters comprises:

where the value of the first variable is equal to real time and the value of the second variable is equal to variable time, repeating:

identifying a given parameter that is nearest to one of the thresholds of the given parameter;

where a correlation between the second variable and the given parameter is greater than or equal to 0.5, modifying the given parameter, until no more parameters are near the thresholds, or until a correlation between the second variable and each parameter near one of the thresholds is less than 0.5.

5. The method of claim 1, wherein adjusting the to-be-affected parameters comprises:

where the value of the first variable is equal to variable time and the value of the second variable is equal to variable time, repeating:

identifying a given parameter that is nearest to one of the thresholds of the given parameter;

where a correlation between the first variable and the given parameter is greater than or equal to 0.5, and a correlation between the second variable and the given parameter is greater than or equal to 0.5, modifying the given parameter, until no more parameters are near the thresholds, or until a correlation between the first variable and each parameter near one of the thresholds is less than 0.5 and a correlation between the second variable and each parameter near one of the thresholds is less than 0.5.

6. A computer program product comprising a computer-readable medium having one or more computer programs stored thereon, wherein execution of the computer programs by one or more processors causes a method to be performed, the method for automatically maintaining an autonomic computing system in a steady state, the autonomic computing system having a plurality of parameters, each parameter having one or more thresholds, the autonomic computing system having a plurality of influencers, adjustment of the influencers affecting values of the parameters, the method comprising:

receiving a value of a first variable specifying how the influencers are changed once a decision has been made to change the influencers, the value of the first variable being one of real time and variable time;

receiving a value of a second variable specifying how the system and the parameters are affected responsive to a change in the parameters, the value of the second variable being one of real time and variable time;

receiving a value of a third variable specifying whether the influencers each affect a distinct parameter or each affect more than one of the parameters in common, the value of the third variable being one of distinct and common; and, adjusting a given influencer to affect one or more of the parameters that are each reaching one of the thresholds of the parameter, based on the values of the first variable, the second variable, and the third variable, the one or more of the parameters referred to as to-be-affected parameters, so that the to-be-affected parameters are no longer reaching the thresholds.

7. The computer program product of claim 6, wherein adjusting the given influencer comprises:

where the value of the first variable is equal to real time, the value of the second variable is equal to real time, and the value of the third variable is equal to distinct, identifying and modifying the given influencer of a given parameter that is tending towards one of the thresholds of the given parameter and that has a highest correlation between the given influencer and the given parameter.

8. The computer program product of claim 6, wherein adjusting the given influencer comprises:

where the value of the first variable is equal to real time, the value of the second variable is equal to variable time, and the value of the third variable is equal to distinct, identifying and modifying the given influencer of a given parameter that is tending towards one of the thresholds of the given parameter, that has a correlation r1 between the given influencer and the given parameter greater than or equal to 0.5, that has a correlation r2 between the given influencer and the second variable that is greater than or equal to 0.5, and that has a highest product of r1 and r2.

9. The computer program product of claim 6, wherein adjusting the given influencer comprises:

where the value of the first variable is equal to variable time, the value of the second variable is equal to real time, and the value of the third variable is equal to distinct, identifying and modifying the given influencer of a given parameter that is tending towards one of the thresholds of the given parameter, that has a correlation r1 between the given influencer and the first variable that is greater than or equal to 0.5, that has a correlation r2 between the given influencer and the given parameter that is greater than or equal to 0.5, and that has a highest product of r1 and r2.

10. The computer program product of claim 6, wherein adjusting the given influencer comprises:
where the value of the first variable is equal to variable time, the value of the second variable is equal to variable time, and the value of the third variable is equal to distinct, identifying and modifying the given influencer of a given parameter that is tending towards one of the thresholds of the given parameter, that has a correlation r1 between the given influencer and the given parameter that is greater than or equal to 0.5, that has a correlation r2 between the given influencer and the first variable that is greater than or equal to 0.5, that has a correlation r3 between the given influencer and the second variable that is greater than or equal to 0.5, and that has a highest product of r1, r2, and r3.

11. The computer program product of claim 6, wherein adjusting the given influencer comprises:
where the value of the first variable is equal to real time, the value of the second variable is equal to real time, and the value of the third variable is equal to common,
where just a single given parameter is tending towards one of the thresholds of the single given parameter, selecting and modifying the given influencer of the single given parameter having a high correlation r between the given influencer and the single given parameter, such that other parameters influenced by the given influencer are close to median values thereof, and such that a correlation r between the given influencer and each other parameter influenced by the given influencer is less than 0.5.

12. The computer program product of claim 6, wherein adjusting the given influencer comprises:
where the value of the first variable is equal to real time, the value of the second variable is equal to real time, and the value of the third variable is equal to common,
where only two given parameters are each similarly tending towards one of the thresholds thereof, selecting and modifying the given influencer of the two given parameters such that a product of a correlation r between the given influencer and each given parameter is greater than or equal to 0.5, such that other parameters influenced by the given influencer are close to median values thereof, and such that a correlation between the given influencer and each other parameter influenced by the given influencer is less than 0.5; and,
where only two given parameters are each dissimilarly tending towards one of the thresholds thereof, selecting and modifying the given influencer of the two given parameters such that a product of a correlation between the given influencer and each given parameter is greater than or equal to 0.5, such that other parameters influenced by the given influencer are close to median values thereof, and such that a correlation between the given influencer and each other parameter influenced by the given influencer is greater than or equal to −0.5 and less than 0.5.

13. The computer program product of claim 6, wherein adjusting the given influencer comprises:
where the value of the first variable is equal to real time, the value of the second variable is equal to variable time, and the value of the third variable is equal to common,
where just a single given parameter is tending towards one of the thresholds of the single given parameter, selecting and modifying the given influencer of the single given parameter having a high correlation r1 between the given influencer and the single given parameter, such that other parameters influenced by the given influencer are close to median values thereof, such that a correlation r between the given influencer and each other parameter influenced by the given influencer is less than 0.5, such that a correlation r2 between the given influencer and the second variable is greater than or equal to 0.5, and such that a product of r1 and r2 is greater than or equal to 0.5.

14. The computer program product of claim 6, wherein adjusting the given influencer comprises:
where the value of the first variable is equal to real time, the value of the second variable is equal to variable time, and the value of the third variable is equal to common,
where only two given parameters are each similarly tending towards one of the thresholds thereof, selecting and modifying the given influencer of the two given parameters such that a product of a correlation r1 between the given influencer and each given parameter is greater than or equal to 0.5, such that other parameters influenced by the given influencer are close to median values thereof, such that a correlation r between the given influencer and each other parameter influenced by the given influencer is less than 0.5, such that a correlation r2 between the given influencer and the second variable is greater than or equal to 0.5, and such that a product of each correlation r1 and the correlation r2 is greater than or equal to 0.5; and,
where only two given parameters are each dissimilarly tending towards one of the thresholds thereof, selecting and modifying the given influencer of the two given parameters such that a product of a correlation r1 between the given influencer and each given parameter is greater than or equal to 0.5, such that other parameters influenced by the given influencer are close to median values thereof, such that a correlation r between the given influencer and each other parameter influenced by the given influencer is less than 0.5 and greater than or equal to −0.5, such that a correlation r2 between the given influencer and the second variable is greater than or equal to 0.5, and such that a product of each correlation r1 and the correlation r2 is greater than or equal to 0.5.

15. The computer program product of claim 6, wherein adjusting the given influencer comprises:
where the value of the first variable is equal to variable time, the value of the second variable is equal to real time, and the value of the third variable is equal to common,
where just a single given parameter is tending towards one of the thresholds of the single given parameter, selecting and modifying the given influencer of the single given parameter having a high correlation r1 between the given influencer and the single given parameter, such that other parameters influenced by the given influencer are close to median values thereof, such that a correlation r between the given influencer and each other parameter influenced by the given influencer is less than 0.5, such that a correlation r2 between the given influencer and the first variable is greater than or equal to 0.5, and such that a product of r1 and r2 is greater than or equal to 0.5.

16. The computer program product of claim 6, wherein adjusting the given influencer comprises:

where the value of the first variable is equal to variable time, the value of the second variable is equal to real time, and the value of the third variable is equal to common,         where only two given parameters are each similarly tending towards one of the thresholds thereof, selecting and modifying the given influencer of the two given parameters such that a product of a correlation r1 between the given influencer and each given parameter is greater than or equal to 0.5, such that other parameters influenced by the given influencer are close to median values thereof, such that a correlation r between the given influencer and each other parameter influenced by the given influencer is less than 0.5, such that a correlation r2 between the given influencer and the first variable is greater than or equal to 0.5, and such that a product of each correlation r1 and the correlation r2 is greater than or equal to 0.5; and,         where only two given parameters are each dissimilarly tending towards one of the thresholds thereof, selecting and modifying the given influencer of the two given parameters such that a product of a correlation r1 between the given influencer and each given parameter is greater than or equal to 0.5, such that other parameters influenced by the given influencer are close to median values thereof, such that a correlation r between the given influencer and each other parameter influenced by the given influencer is less than 0.5 and greater than or equal to −0.5, such that a correlation r2 between the given influencer and the first variable is greater than or equal to 0.5, and such that a product of each correlation r1 and the correlation r2 is greater than or equal to 0.5.

17. The computer program product of claim 6, wherein adjusting the given influencer comprises:

where the value of the first variable is equal to variable time, the value of the second variable is equal to variable time, and the value of the third variable is equal to common,         where just a single given parameter is tending towards one of the thresholds of the single given parameter, selecting and modifying the given influencer of the single given parameter having a high correlation r1 between the given influencer and the single given parameter, such that other parameters influenced by the given influencer are close to median values thereof, such that a correlation r between the given influencer and each other parameter influenced by the given influencer is less than 0.5, such that a correlation r2 between the given influencer and the first variable is greater than or equal to 0.5, such that a correlation r3 between the given influencer and the second variable is greater than or equal to 0.5, and such that a product of r1 and r3 is greater than or equal to 0.5.

18. The computer program product of claim 6, wherein adjusting the given influencer comprises:

where the value of the first variable is equal to variable time, the value of the second variable is equal to variable time, and the value of the third variable is equal to common,         where only two given parameters are each similarly tending towards one of the thresholds thereof, selecting and modifying the given influencer of the two given parameters such that a product of a correlation r1 between the given influencer and each given parameter is greater than or equal to 0.5, such that other parameters influenced by the given influencer are close to median values thereof, such that a correlation r between the given influencer and each other parameter influenced by the given influencer is less than 0.5, such that a correlation r2 between the given influencer and the first variable is greater than or equal to 0.5, such that a correlation r3 between the given influencer and the first variable is greater than or equal to 0.5, and such that a product of each correlation r1 and the correlation r3 is greater than or equal to 0.5; and,         where only two given parameters are each dissimilarly tending towards one of the thresholds thereof, selecting and modifying the given influencer of the two given parameters such that a product of a correlation r1 between the given influencer and each given parameter is greater than or equal to 0.5, such that other parameters influenced by the given influencer are close to median values thereof, such that a correlation r between the given influencer and each other parameter influenced by the given influencer is less than 0.5 and greater than −0.5, such that a correlation r2 between the given influencer and the first variable is greater than or equal to 0.5, such that a correlation r3 between the given influencer and the first variable is greater than or equal to 0.5, and such that a product of each correlation r1 and the correlation r3 is greater than or equal to 0.5.

19. The method of claim 1, wherein the value of the first variable being real time means that the parameters are changed immediately once the decision has been made to change the parameters, and the value of the first variable being variable time means that the parameters are changed after a length of variable time has elapsed once the decision has been made to change the parameters,     and wherein the value of the second variable being real time means that the parameters are affected immediately once the change has been made in the parameters, and the value of the second variable being variable time means that the parameters are affected after a length of variable time has elapsed once the change has been made in the parameters.

* * * * *